2,606,466

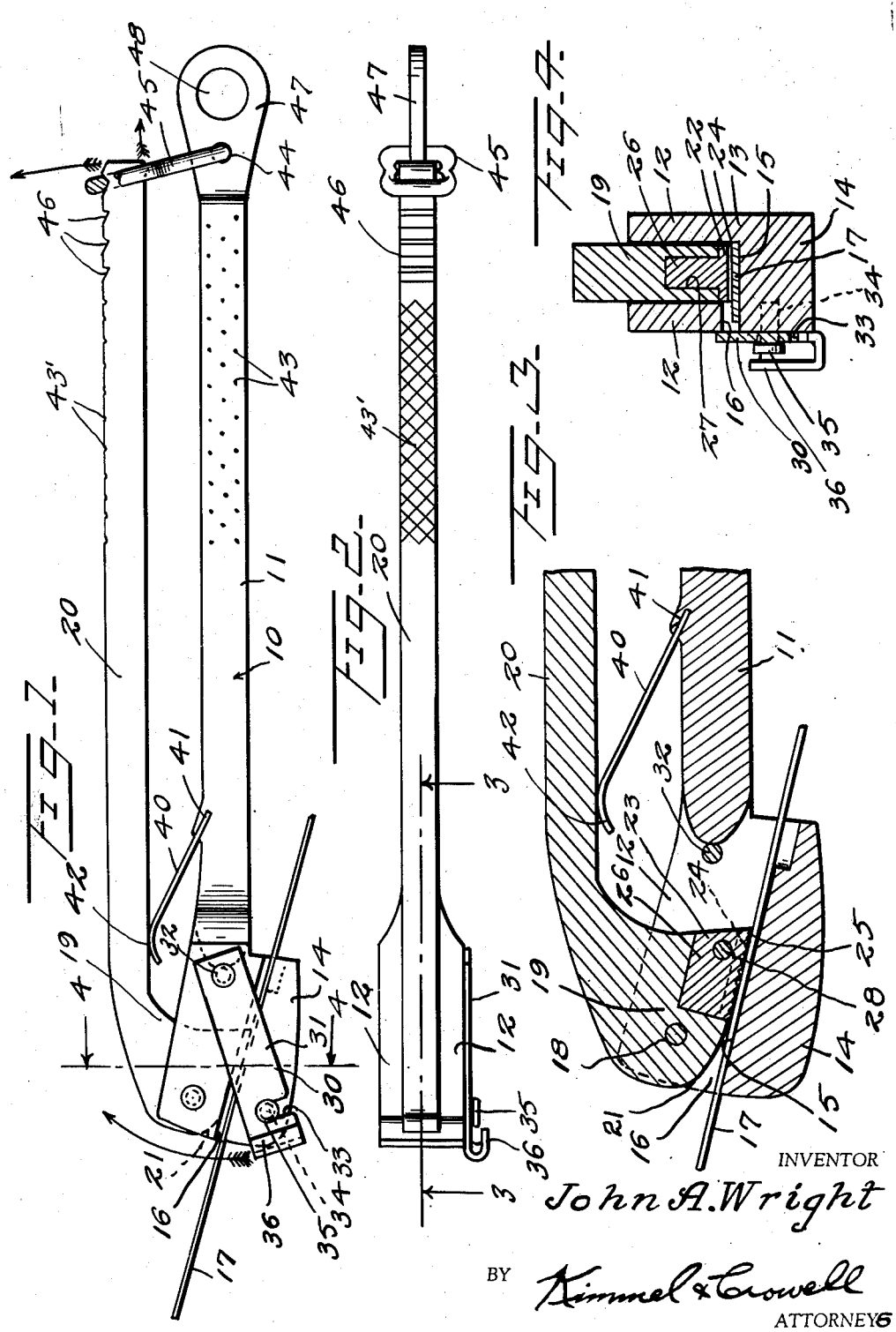
Aug. 12, 1952     J. A. WRIGHT     2,606,466
FISH TAPE PULLER
Filed June 4, 1951
INVENTOR
*John A. Wright*
BY *Kimmel & Crowell*
ATTORNEYS Patented Aug. 12, 1952

UNITED STATES PATENT OFFICE 2,606,466

FISH TAPE PULLER

John A. Wright, Huntsville, Ala.

Application June 4, 1951, Serial No. 229,825

1 Claim. (Cl. 81—5.1)

This invention relates to a fish tape puller, and more particularly to such a device adapted to be utilized by electricians or the like in pulling the fish tapes, which are customarily attached to electrical wires, or similar wiring devices, through restricted or curved openings, the arrangement being such that the wires are pulled through by means of the tape after the latter has been guided through the opening.

A primary object of the invention is the provision of an improved fish tape puller which will insure a firm non-slipping grip upon fish tape at all times.

An additional object of the invention is the provision of such a fish tape puller provided with a transverse slot through a jaw thereof whereby the fish tape may be readily inserted and removed from the slot with a minimum of effort and difficulty.

A further object of the invention is the provision of a closure plate for the slot whereby the tape may be securely held therein against accidental displacement when the opposed clamping jaws of the puller are released prior to repositioning the same for a new grip on the tape.

Still another object of the invention is the provision of means for association with such a device whereby the jaws may be securely locked on the tape when desired.

An additional object of the invention is the provision of a fish tape puller which is sturdy and durable in construction, reliable and efficient in operation and simple and inexpensive to manufacture and utilize.

Still other objects will in part be obvious and in part be pointed out as the description of the invention proceeds and shown in the accompanying drawing, wherein there is disclosed a preferred embodiment of this inventive concept.

In the drawing:

Fig. 1 is a side elevational view of one form of fish tape puller embodying features of the instant invention, certain concealed portions thereof being indicated in dotted lines;

Fig. 2 is a top plan view of the construction of Fig. 1;

Fig. 3 is an enlarged sectional view taken substantially along the line 3—3 of Fig. 2, as viewed in the direction indicated by the arrows; and Fig. 4 is an enlarged sectional view taken substantially along the line 4—4 of Fig. 1, as viewed in the direction indicated by the arrows.

Similar reference characters refer to similar parts throughout the several views of the drawing.

Referring now to the drawing in detail, there is generally indicated at 10 an elongated member including a handle portion 11 and a bifurcated end portion 12. One of the bifurcations 12 is elongated as at 13 and has extending transversely therefrom a block 14 which extends entirely across the transverse width thereof and is provided on its upper face with a jaw 15. The other bifurcation 12 terminates above the jaw 15, to provide a transversely extending slot 16 within which a fish tape 17 is adapted to be positioned, the arrangement being such that the tape may be either inserted in slot 16 from an end thereof, or from the side through slot 16.

Pivotally mounted between bifurcations 12, as by means of a pivot pin 18, is the arcuate end 19 of a clamping lever, which includes an elongated handle 20 extending in parallelism, when the jaws are closed, to handle 11. Arcuate portion 19 is provided with a lower arcuate surface 21, whereby pivotal movement of the same relative to jaw 15 may be readily effected. A clamping jaw generally indicated at 22 is associated with the lower face of arcuate portion 19, in opposed relation to fixed jaw 15, and includes a removable heel plate 23 having a relatively broad lower face 24 provided with serrations or ridges 25 adapted securely to engage fish tape 17. Plate 24 includes a perpendicular flange 26 which extends upwardly into a suitable slot 27 formed in the underside of arcuate end 19 being secured therein as by a pin 28 which may be force-fitted or otherwise suitably secured in order that the heel plate may be removed and replaced when the same becomes worn or injured.

It will now be seen that a fish tape may be securely held between the serrations 25 of the clamping jaw 22 and its opposed fixed jaw 15.

In order to preclude accidental displacement of the tape laterally of the slot, a closure member generally indicated at 30 is provided and includes a rectangular plate-like member 31 pivotally mounted as by a pivot pin 32 on the side of the bifurcation 12 adjacent the open side of slot 16. Plate 31 is provided with a notch 33 adapted to engage over a pin 34 provided with a head 35 secured to the side wall of the jaw 14. The end of plate 31 is reverted as at 36 to provide a finger-engaging portion whereby the plate may be readily engaged with and disengaged from pin 34, as desired.

A relatively light leaf spring 40 is secured at one end 41 in a suitable notch in the handle portion of elongated member 10 and its free arcuate end 42 engages the underside of clamping lever 20 in order to afford a light bias thereagainst to release the jaws from clamping engagement on fish tape 17 when opposing pressure on handles 20 and 11 is released. Handles 11 and 20 are provided with suitable scoring 43 and 43', respectively, to preclude slippage of a hand grip thereon. Adjacent the free end of elongated handle 11 is a bore 44 through which extends the bight of a substantially rectangular loop 45, the opposite end of which is adapted, when the jaws are in clamped relation, selectively to engage one of a series of notches 46 on the upper side of clamping lever 20 for the purpose of locking the handle members in associated relation, and hence, their associated jaws when so desired.

Beyond the bore 44 the end of elongated handle 11 is flattened and enlarged, as at 47, and provided with a relatively large aperture 48 to which any suitable pulling implement, either manual or power-actuated, may be attached when manual force applied to handles 11 and 20 alone is insufficient to draw the fish tape and its associated conduit into desired position.

From the foregoing, it will now be seen that there is herein provided an improved fish tape puller which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A fish tape puller comprising an elongated handle formed with a bifurcated forward end, the sides of said bifurcated end having substantial length and extending lengthwise of said handle, a jaw fixed to one bifurcated side and extending transversely across the space between the sides of said forward end, said jaw having a length equal to the length of said one side, the other bifurcated side having an edge spaced from the inner face of said jaw to thereby form a laterally opening slot, a second jaw confronting said first jaw and pivotally disposed between the bifurcated sides of said forward end, said second jaw extending rearwardly of the pivotal mounting therefor, a handle fixed to said second jaw, a latch bar pivoted to said other bifurcated side, means carried by said first-named jaw for latching said bar across said slot, and a latching loop pivotally carried by the rear of one handle and engageable over the rear of the other handle to thereby hold said handles in jaw clamping position.

JOHN A. WRIGHT.

REFERENCES CITED

The following references are of record in the file of this patent:

UNITED STATES PATENTS

| Number | Name | Date |
|---|---|---|
| 297,788 | Green | Apr. 29, 1884 |
| 371,873 | Brooks | Oct. 18, 1887 |
| 1,111,878 | Carroll | Sept. 29, 1914 |
| 1,238,905 | Foster | Sept. 4, 1917 |
| 2,542,249 | Higgins | Feb. 20, 1951 |